United States Patent Office 3,556,759
Patented Jan. 19, 1971

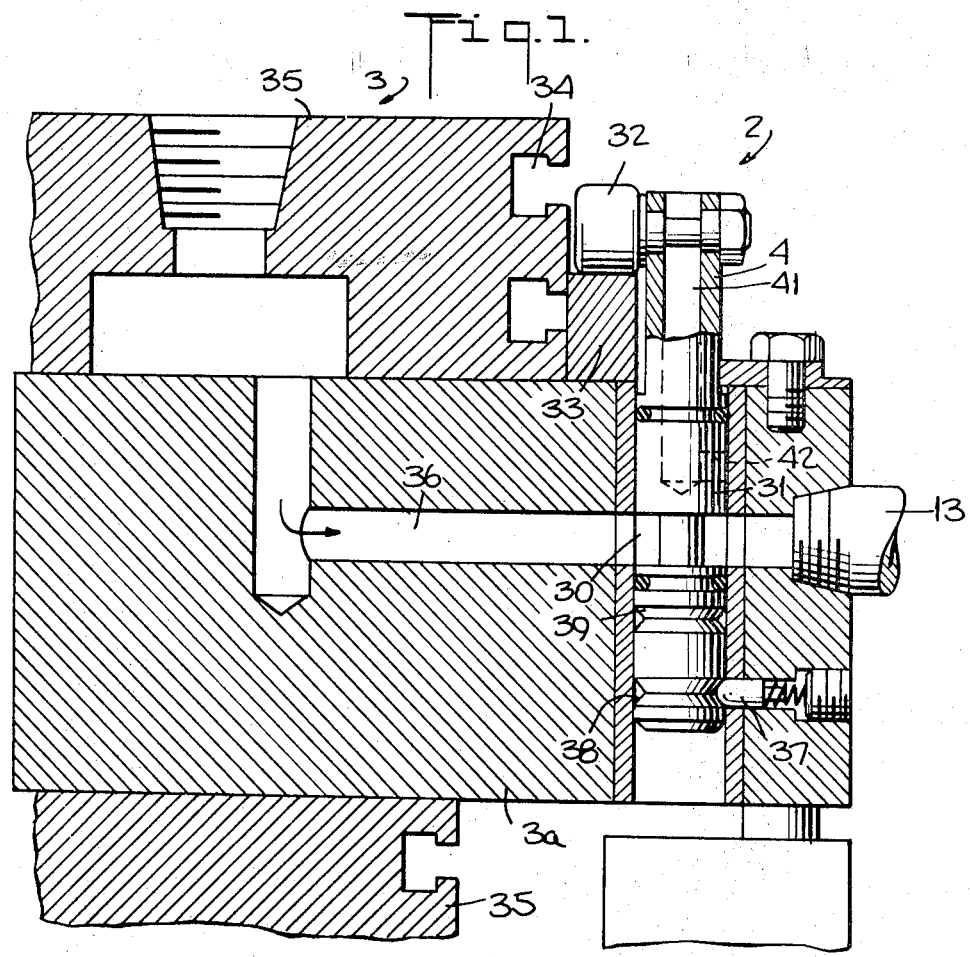
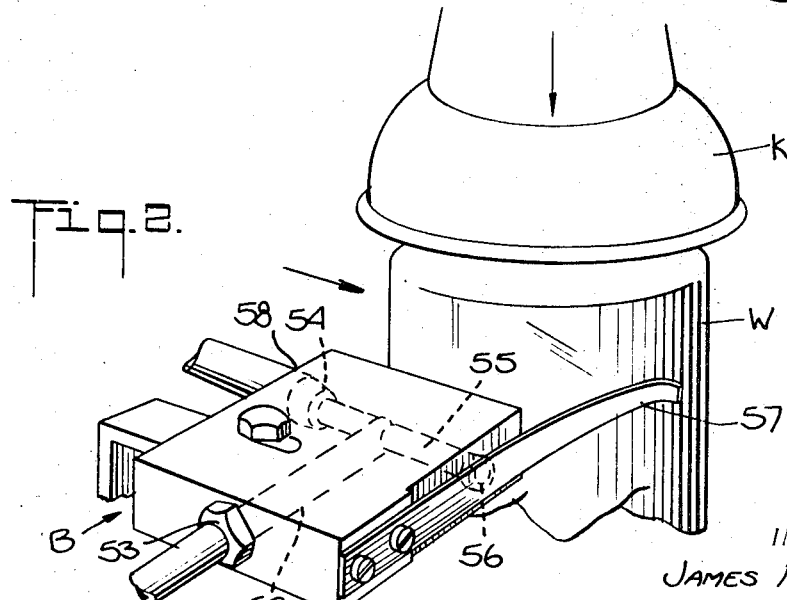

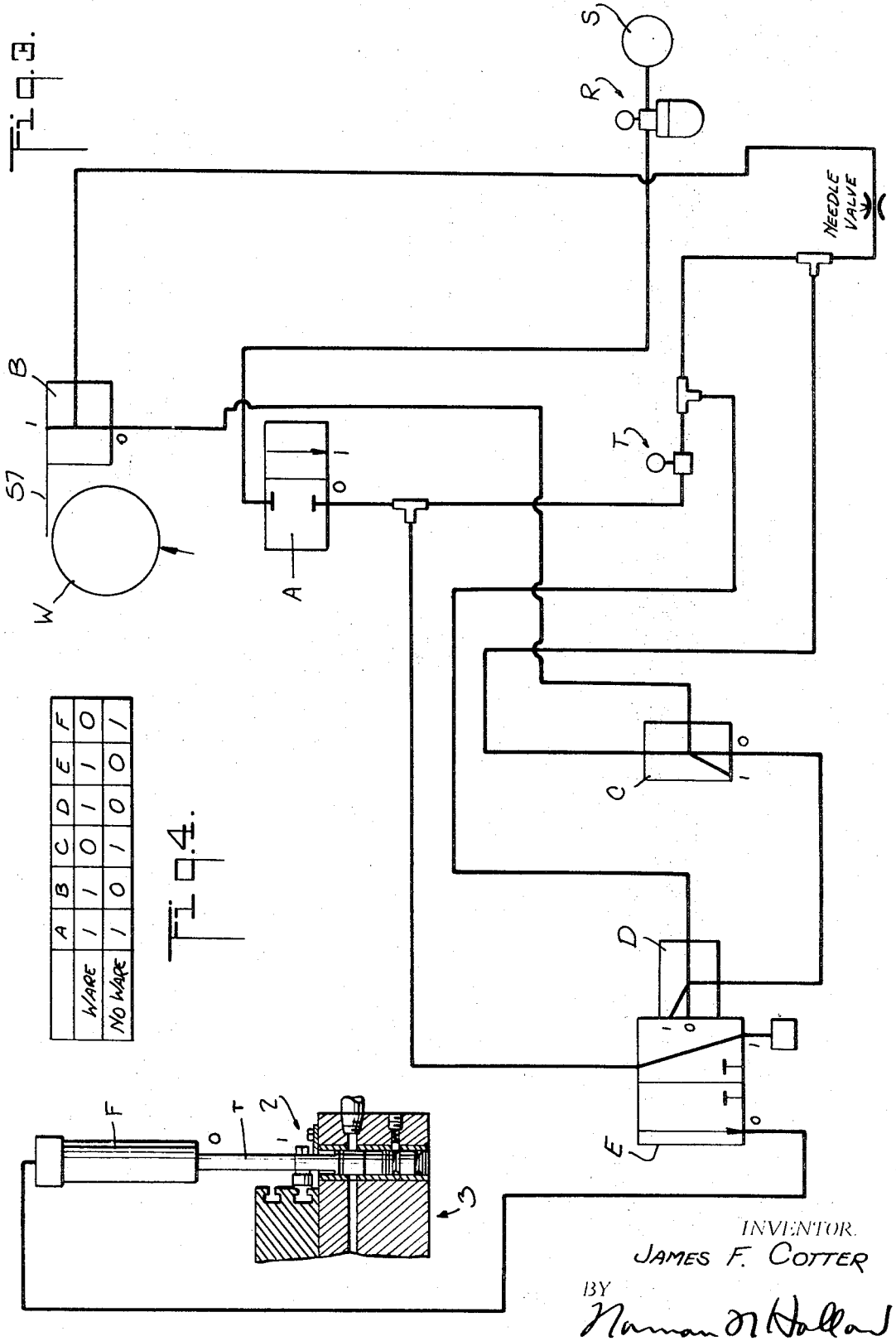

3,556,759
FLUIDIC CONTROL SYSTEM FOR VACUUM CUT-OFF IN A BURN-OFF MACHINE
James F. Cotter, Lancaster, Ohio, assignor to Anchor Hocking Corporation, Lancaster, Ohio, a corporation of Delaware
Filed Mar. 12, 1968, Ser. No. 712,452
Int. Cl. C03b 33/08
U.S. Cl. 65—159                                  3 Claims

ABSTRACT OF THE DISCLOSURE

A fluidic control system for cutting off the vacuum supply to a ware-holding chuck in a glass burn-off machine in the absence of ware in the chuck. The system comprises a mechanical switch which admits pressure to a fluid circuit in conjunction with the opening of the vacuum control valve at the ware loading zone; a mechanically operated fluid switch for sensing whether ware is present at the pick-up station and providing an appropriate signal to said circuit; and a series of fluid amplifying switches in the circuit which actuate an air cylinder to close the vacuum control valve when a no-ware signal is received from the ware-sensing switch.

BACKGROUND OF THE INVENTION

The present invention relates to the glass making art and particularly to improvements in the means for controlling the vacuum in the ware-holding systems of glass burn-off machines.

In the modern process of glassware manufacturing one of the steps in the making of tumblers and the like is the removal of excess glass portions from the pieces of ware coming from the molds. This operation is accomplished by the use of a burn-off machine which picks the pieces of ware from conveyor and burns off the excess portions by the application of a burner flame before returning the ware to the conveyor for further processing.

These burn-off machines generally include a large rotary turret which mounts a number of ware-holding spindles about its periphery for picking up the pieces of ware in succession from the conveyor bringing them from the forming machinery. An axially located distributor is provided above the turret through which the various gases required for the burn-off process are supplied. To accomplish the actual burn-off each spindle has an associated ring burner on the turret into which the ware is inserted and rotated for a time during a portion of the turret cycle. In addition to the fuel lines to the ring burners, a vacuum line is provided between the central distributor and each spindle for supplying a vacuum to a ware-holding chuck on the lower end of each spindle to hold the ware therein during the burn-off portion of the cycle.

The vacuum is controlled by a valve on the turret which is actuated by cams on the distributor. The valve is snapped open at the ware loading station and is closed after the burn-off operation to release the ware onto another conveyor for further finishing.

In the event that no ware appears on the conveyor at the loading station it becomes necessary to shut-off the vacuum to avoid the sucking of the burner flame into the system during the burn-off portion of the cycle. Failure to cut off the vacuum may allow the flame and hot combustion products to pass through the spindle and distributor causing thermal distortion of these parts, mechanical failure, and leakage of the gases with possible combustion at or explosion of the distributor.

A major problem encountered in providing a suitable cut-off control system is the range of ambient temperatures encountered in such machines. Prior systems used for this purpose have met with mixed success.

SUMMARY OF THE INVENTION

The system of the present invention is a further improvement on the 36-head burn-off machine covered in my co-pending applications Ser. No. 633,830, filed Apr. 26, 1967, now Pat. No. 3,483,661, and Ser. No. 662,347, filed Aug. 22, 1967 and assigned to the assignee of the present invention. This invention relates to control of the ware-holding vacuum system and embodies the use of an improved fluidic system which controls the closing off of the vacuum if no ware is picked up in an individual burn-off head. Unlike prior systems it has been found to remain operable and dynamically stable through the full range of temperatures in the burn-off machine.

In general, the system operates by mechanically sensing each piece of ware arriving at the loading or pick-up station. The control system will leave the vacuum ware-holding system in operation during normal functioning when a piece of ware is in the head. When no ware is present, the sensing device provides an appropriate signal and operates through a fluidic or fluid-amplifying circuit to activate an air cylinder which closes the regular vacuum control valve at the distributor manifold.

It is therefore an object of the present invention to provide an improved vacuum operated ware-holding system for burn-off machines.

It is another object of the present invention to provide an improved control system for the vacuum ware-holding system in glass burn-off machines.

It is another object of the present invention to provide an improved control system utilizing a fluid circuit.

It is a further object of the present invention to provide an improved system for shutting off the vacuum in the ware-holding chuck when no ware is present at the loading or pick-up station.

It is another object of the present invention to provide an improved means for detecting the presence of ware at the pick-up station.

Other and further objects of the invention will be obvious upon an understanding of the illustrative embodiment about to be described, or will be indicated in the appended claims, and various advantages not referred to herein will occur to one skilled in the art upon employment of the invention in practice.

DESCRIPTION OF THE DRAWINGS

A preferred embodiment of the invention has been chosen for purposes of illustration and description and is shown in the accompanying drawings, forming a part of the specification wherein:

FIG. 1 is a sectional view of a portion of the gas distributor in a glass burn-off machine showing a valve assembly for controlling the source of vacuum to the ware-holding chuck.

FIG. 2 is a perspective view of the improved means of the present invention for detecting ware at the pick-up station in a glass burn-off machine and showing the ware and chuck arriving at the station.

FIG. 3 is a schematic diagram of the improved fluid circuit in the control system of the present invention.

FIG. 4 is a table of operating conditions for the circuit components when ware is present and when no ware is present at the loading zone.

DETAILED DESCRIPTION OF THE PREFERRED EMBODIMENT

Firstly with regard to the normal operation of the vacuum control system during a turret cycle, as shown in FIG. 1 the vacuum control valve 2 is mounted in a rotatable manifold 3a which is part of the machine's central distributor 3. The valve 2 has a valve body 4, of the spool type, with a port 30 and a land 31 near its center. A roller 32 is provided on its upper end which cooperates with suitable cam means 33, mounted in a keyway 34 at the ware pick-up station on the fixed portion 35 of the distributor 3. When a spindle reaches the pick-up station during turret rotation the lower cam 33 acts to raise the valve spool 4 in its bore to open the vacuum passage 36 to supply line 13, which communicates with the chuck. An upper cam mounted in the upper keyway 34 drives the spool 4 downwardly to close-off communication in the vacuum passage when the spindle reaches the point in the cycle where the ware is removed. A spring loaded detent 37 holds the valve spool 4 in the open or closed position by engaging appropriate grooves 38 or 39, respectively, on the lower end of the spool. Suitable seals 40 are provided on opposite sides of the central portion of the spool 4 to minimize the leakage of atmospheric air into the passage 36. The valve spool 4 is also provided with an axial bore 41 extending from its top to the central portion and opening on the surface of the land 31. When the valve 2 is in the opened position the opening 42 of this bore 41 will be closed by the sides of the bore in the distributor body 3a. However, when the valve 2 is snapped to the closed position cutting-off the source of vacuum this bore opening 42 will communicate with the interior of the chuck venting it to atmosphere and permitting release of the ware held therein.

Thus, in operation, the portion 3a of the distributor 3 in which the valve 2 is mounted is rotated with the burn-off turret. The operating cams are provided in the keyways 34 on the upper distributor section 35 which is fixed to the machine center post. At the appropriate stations, as the turret rotates, the cams will successively contact the roller 32 to snap the valve spool 4 to the opened or closed position communicating or cutting-off the source of vacuum to the ware-holding spindle and chuck.

It will be seen that if no ware is present on the conveyor when a chuck is at the loading zone, initiation of the vacuum in the chuck results in air being drawn into the spindle and vacuum system since the ware is not available to block the chuck opening. The vacuum system ordinarily remains on until the chuck reaches the point of turret rotation where the ware is unloaded after the burn-off operation.

The firing of the ring burner below the chuck when no ware is present can result in the flame and exhaust gases being drawn into the vacuum system presenting an obviously dangerous condition. The system of the present invention will shut off the vacuum supplied to an empty chuck if no ware appears at the pick-up station after the vacuum is initiated. This is accomplished by arranging a ware detector at the pick-up station which will provide a signal each time a piece of ware arrives at the station. When no ware is present upon the arrival of a chuck, a signal will be produced by the detector which will operate an air cylinder or other suitable means through a fluid circuit to close the vacuum control valve for the remainder of the burn-off portion of the turret cycle.

The ware detector B is shown in FIG. 2 sensing a piece of ware W as the chuck K is descending to pick up the ware. The detector B comprises a housing H containing a system of bores which conduct fluid flow in a manner to produce the appropriate signals desired in this application. One bore 52 opens at a fluid pressure inlet 53 and has two bores 54 and 55 at its opposite end. The bores 54 and 55 are substantially at right angles to bore 52 and axially opposite each other. The bore 54 opens at a fluid outlet 58 and the bore 55 opens at a port 56 which is normally covered by a spring finger 57. The spring finger 57 is arranged to extend into the path of the ware W passing on the supply conveyor to the burn-off machine. A piece of moving ware W striking the tip of the spring finger 57 as shown will tend to bend it opening the port 56. When fluid pressure is supplied at the inlet 53 and the spring finger 57 is covering the port 56, the entire fluid flow will be through the outlet 58. However, when a piece of ware W strikes the finger 57 uncovering the port 56, some of the fluid will escape therethrough reducing the pressure output at the outlet 58. This change in pressure provides a signal to a fluid circuit which is shown in FIG. 3 and which operates an air cylinder or other suitable means to close the vacuum control valve. The two conditions of the detector B are indicated as 0 and 1 for "no ware" and "ware" present, respectively.

With reference to FIG. 3, the ware detector B is shown as the sensing valve B in the fluid circuit diagram. This circuit includes a mechanical vacuum timing valve A located at the pick-up station which is opened and closed by suitable means, such as cams on the distributor, as each spindle and chuck K passes the pick-up station. It is opened in conjunction with the opening of the vacuum control valve 2 and is closed shortly thereafter to recycle the fluid circuit as will be seen hereinafter. This valve A may be of the mechanical sliding type with opened and closed ports indicated as 0 and 1.

Valves C and D are fluidic relay valves of the type in which a signal input such as a given air pressure to a port operates the valve to provide power air output at outlet 1 with air on the input and to switch the power air to the second output 0 in the absence of signal air on the input.

Valve E is a diaphragm shuttle valve in which a no input signal condition operates a diaphragm to cut off signal air output.

This system controls the operation of air cylinder F whose rod r operates between 0 condition which will pass the opened vacuum control valve 2 and position 1 which will snap the valve 2 closed.

FIG. 4 shows the operating condition of these various components in table form for both the "ware" present and "no ware" present situations at the pick-up station.

OPERATION

In operation, the two position vacuum control valve 2 shown in FIG. 1 is snapped from the closed to the opened position as its chuck K enters the loading zone by the action of its roller 32 against the cam 33 mounted on the supply manifold 35. The timer valve A will also be operated by a cam on the distributor and snapped from the 0 to the 1 condition thus admitting fluid pressure from a source S through a regulator and filter R to the fluid circuit. The fluid may be compressed air or other suitable operating fluid.

If a piece of ware is present at the loading zone to be picked up by the chuck, the ware sensing finger 57 of valve B will be bent causing the fluid system which has been energized by the opening of valve A to react into the condition indicated in FIG. 4 as the response to the ware present signal. Under these conditions the operating rod r of the air cylinder F will remain in the inoperative position 0 and the vacuum control valve 2 remains open holding the ware W in the chuck K during the burn-off portion of the cycle.

In the event that no ware is present when the valve A is actuated, the valve B will remain in the 0 condition supplying a full pressure signal to the valve C. This pressure on the input of valve C will cause the flow which passes from valve A through a regulator filter T to be diverted into condition 1. The resultant loss of pressure at the input of valve D will put this valve in the 0 condition causing the fluidic relay E through the diaphragm to move the shuttle to actuate the air cylinder F to condition 1. In this latter condition the operating rod r of the air cylinder F will be forced downwardly striking the valve 2 and snapping it into the closed position cutting off the vacuum to the chuck.

The timer valve A will be shut off by another cam passing on the distributor thus resetting the fluid system and the air cylinder F in preparation for the arrival of the next chuck and piece of ware at the loading station.

It will thus be seen that an improved control system has been provided for the vacuum ware-holding system of a burn-off machine which is insensitive to the high operating temperatures in this environment as compared to previously used systems and which has been found to remain operable and dynamically stable through the full range of temperatures in the burn-off machine environment. This system with the improved ware detecting means is comparatively trouble free, inexpensive to manufacture and operate, and readily adaptable to use on existing burn-off machines.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a glassware burn-off machine having a plurality of ware holding chucks mounted on a rotating turret for movement in a generally circular path and having a source of vacuum coupled to the chucks for retaining the ware therein for a portion of the path and including a vacuum control valve for each chuck with means for opening said vacuum control valve for applying vacuum to the chuck at one point in the chuck path and means for closing the vacuum control valve to cut off the vacuum at another point in the chuck path, an improved fluid operated no-ware sensing and vacuum cut-off system comprising:

(a) a fluid operated motor for closing said vacuum control valve, (b) a ware detector positioned adjacent said path having a fluid inlet and a fluid outlet and including means for sensing ware in a chuck and for causing a changed fluid pressure at said fluid outlet when ware is absent from the chuck, (c) a motor control valve having a fluid inlet for being coupled to a source of fluid under pressure and a fluid outlet coupled to said fluid operated motor and having a fluid operated valve control means, and (d) fluid relay valve means having a fluid inlet and being operatively coupled between said ware detector fluid outlet and the valve control means of said motor control valve.

2. The system as claimed in claim 1 in which said ware sensing means comprises a second fluid outlet and a ware sensing member resiliently held in sealing engagement with said second fluid outlet and positioned for being moved to open said second fluid outlet when engaged by the ware in the chucks.

3. The system as claimed in claim 1 which further comprises a timing valve coupled between said fluid inlets and a source of fluid under pressure, and means on said machine to open said timing valve only when a chuck is at said ware detector.

References Cited

UNITED STATES PATENTS 1,757,211   5/1930   Parker _____ 65—272

ARTHUR D. KELLOGG, Primary Examiner

U.S. Cl. X.R.

65—161, 272; 294—64